(12) United States Patent
Schuh et al.

(10) Patent No.: US 9,728,774 B2
(45) Date of Patent: Aug. 8, 2017

(54) STORAGE STRUCTURE OF AN ELECTRICAL ENERGY STORAGE CELL

(71) Applicant: Siemens Aktiengesellschaft, Munich (DE)

(72) Inventors: Carsten Schuh, Baldham (DE); Thomas Soller, Deggendorf (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 14/411,012

(22) PCT Filed: May 22, 2013

(86) PCT No.: PCT/EP2013/060512
§ 371 (c)(1),
(2) Date: Dec. 23, 2014

(87) PCT Pub. No.: WO2014/000989
PCT Pub. Date: Jan. 3, 2014

(65) Prior Publication Data
US 2015/0325842 A1   Nov. 12, 2015

(30) Foreign Application Priority Data

Jun. 29, 2012 (DE) .................... 10 2012 211 328

(51) Int. Cl.
*H01M 4/36* (2006.01)
*H01M 8/18* (2006.01)
(Continued)

(52) U.S. Cl.
CPC ......... *H01M 4/364* (2013.01); *H01M 4/0471* (2013.01); *H01M 4/38* (2013.01);
(Continued)

(58) Field of Classification Search
CPC .......... H01M 4/364; H01M 4/52; H01M 4/62; H01M 4/38; H01M 12/08; H01M 4/0471;
(Continued)

(56) References Cited

U.S. PATENT DOCUMENTS

| 4,109,060 A | * | 8/1978 | Andersson | .............. | H01M 4/02 |
| | | | | | 204/284 |
| 7,563,537 B2 | * | 7/2009 | Pratt | ..................... | H01M 4/244 |
| | | | | | 429/229 |

(Continued)

FOREIGN PATENT DOCUMENTS

| CN | 1708869 A | 12/2005 |
| DE | 102009057720 A | 6/2011 |

(Continued)

OTHER PUBLICATIONS

English Translation of JP2006172901.*
(Continued)

*Primary Examiner* — Peter F Godenschwager
*Assistant Examiner* — Andrew J Oyer
(74) *Attorney, Agent, or Firm* — Beusse Wolter Sanks & Maire

(57) ABSTRACT

A storage structure of an electrical metal-air energy storage cell is provided including an active storage material and an inert material, wherein particles of the inert material have an aspect ratio of less than 0.7, and wherein subregions of the inert particles are incorporated in a grain volume of grains of the active storage material.

10 Claims, 2 Drawing Sheets

(51) Int. Cl.
| | |
|---|---|
| *H02J 7/00* | (2006.01) |
| *H01M 4/52* | (2010.01) |
| *H01M 4/38* | (2006.01) |
| *H01M 4/62* | (2006.01) |
| *H01M 4/04* | (2006.01) |
| *H01M 12/08* | (2006.01) |
| *H01M 4/02* | (2006.01) |

(52) U.S. Cl.
CPC ............... *H01M 4/52* (2013.01); *H01M 4/62* (2013.01); *H01M 8/18* (2013.01); *H01M 12/08* (2013.01); *H02J 7/0052* (2013.01); *H01M 2004/021* (2013.01); *H01M 2300/0074* (2013.01); *Y02E 60/128* (2013.01)

(58) Field of Classification Search
CPC ..... H01M 2300/0074; H01M 2004/021; H02J 7/0052
See application file for complete search history.

(56) References Cited

U.S. PATENT DOCUMENTS

| | | | |
|---|---|---|---|
| 7,662,505 | B2 | 2/2010 | Suzuki |
| 9,005,826 | B2 | 4/2015 | Landes et al. |
| 2009/0162750 | A1 | 6/2009 | Aiba |
| 2011/0006254 | A1 | 1/2011 | Luhrs |
| 2011/0033769 | A1 | 2/2011 | Huang et al. |
| 2011/0065017 | A1 | 3/2011 | Ha |
| 2012/0034520 | A1 | 2/2012 | Huang |
| 2012/0082922 | A1 | 4/2012 | Ito |
| 2013/0034784 | A1 | 2/2013 | Landes et al. |

FOREIGN PATENT DOCUMENTS

| | | | |
|---|---|---|---|
| JP | S52104735 A | | 9/1977 |
| JP | 2006172901 | * | 6/2006 |
| JP | 2006172901 A | | 6/2006 |
| JP | 2013502039 A | | 1/2013 |
| WO | 2011070006 A1 | | 6/2011 |
| WO | 2012146465 A2 | | 11/2012 |
| WO | 2013045223 A1 | | 4/2013 |
| WO | 2013084733 A1 | | 6/2013 |
| WO | 2013093044 A1 | | 6/2013 |

OTHER PUBLICATIONS

Xu N. et al: A novel solid oxide redox flow battery for grid energy storage; Energy&Environmental Science; vol. 4; No. 12; pp. 4942-4946; ISSN: 1754-5692; DOI: 10.1039/c1ee02489b; XP055064967; Jan. 1, 2011.

EP Search Report dated Nov. 10, 2016, for EP patent application No. 13727548.3.

* cited by examiner

STORAGE STRUCTURE OF AN ELECTRICAL ENERGY STORAGE CELL

CROSS REFERENCE TO RELATED APPLICATIONS

This application is the US National Stage of International Application No. PCT/EP2013/060512 filed May 22, 2013, and claims the benefit thereof. The International Application claims the benefit of German Application No. DE 102012211328.2 filed Jun. 29, 2012. All of the applications are incorporated by reference herein in their entirety.

FIELD OF INVENTION

The invention relates to a storage structure of an electrical energy storage cell.

BACKGROUND OF INVENTION

Surplus electrical power originating, for example, from renewable energy sources can be stored in the power grid only to a limited degree. This also applies to surplus power which is obtained in fossil power plants when they are running within the optimal economic load range but the power is not being demanded by the consumer from the grid. There are various large-scale storage devices for intermediate storage of this surplus power in relatively large amounts. One of these is, for example, a pumped storage power plant. In the battery sector, one approach for electrical energy storage means is to use rechargeable oxide batteries (ROB), i.e. high-temperature metal/air batteries. In these batteries, a metal-based storage medium is reduced or oxidized according to the state of the battery (charging or discharging). In the course of a multitude of these cyclical charging and discharging operations, i.e. oxidation and reduction operations, of the storage medium, there is a tendency in this medium, at the comparatively high operating temperatures to which such a battery is subjected, which are typically between 600° C. and 900° C., for the required microstructure, especially the pore structure of the storage medium and the particle size distribution of the active storage material, to be destroyed by sintering processes. This leads to aging and subsequently to failure of the battery.

SUMMARY OF INVENTION

It is an object of the invention to provide a storage cell of an electrical energy storage means, which has a higher long-term stability compared to the prior art and withstands a higher number of cycles of charging and discharging operations.

A solution to the problem is a storage structure having the features of the claims.

The solution to the problem arises in a storage structure of an electrical metal/air energy storage cell comprising an active storage material and an inert material. The features of the invention are that particles of the inert material have an aspect ratio less than 0.7, and that partial regions of the inert particles are incorporated into a grain volume of grains of the active storage material.

The inert particles have a length to width ratio (aspect ratio $A_R = d_{min}/d_{max}$) characteristic of elongated particles. In this context, the mean minimum diameter in a particle distribution ($d_{min}$) is much smaller than the average maximum diameter in the particle distribution ($d_{max}$). The inert particles have a shape which can generally be referred to as whisker-like, needle-like or platelet-like. Fibrous particles also have the aspect ratio described. These inert particles are additionally incorporated into the particles or grains of the active storage material, meaning that they are partly surrounded by the volume of the grain of the active storage material, or inserted into it like pins. The inert particles therefore serve as spacers between the grains of the active storage material and, through the spatial separation of the grains of the active storage material, prevent sintering or coarsening of the grains of the active storage material.

In this context, the term "inert" is understood to mean that a chemical equilibrium between the inert material and a possible reactant is set to be sufficiently slow that, at the prevailing operating temperatures, there are no reactions that have a lasting effect on the functionality of the storage structure. This is especially understood to mean inert behavior toward a gaseous or liquid reactant which in turn enters into a reaction with the storage material. Moreover, this is understood to mean inert behavior with respect to the storage material per se. Useful inert storage materials are especially zirconia, yttria-stabilized zirconia, calcium oxide, magnesium oxide, alumina, yttria or mixtures of these ceramic inert materials or materials based on the materials mentioned.

In an embodiment of the invention, the wetting angle between the active storage material and the inert material is greater than or equal to 90°. A much smaller wetting angle between the inert material and the storage material would lead, after a number of reaction cycles, to a spread of the active storage material over the inert material, as a result of which there would no longer necessarily be any spacing effect of the inert material.

In a further configuration of the invention, the active storage material is based on iron and/or iron oxide. During the operation of the storage cell, during the respective charging and discharging, there is always reduction of the iron oxide and oxidation of the iron oxide, i.e. a change in the oxidation state of the iron in elemental or oxidically bound form. In the course of production of the storage structure, it is accordingly possible to use iron oxide or iron as active storage material; therefore, the storage cell is either discharged or charged in its starting state. In an advantageous configuration of the invention, the iron oxide is typically in the form of $Fe_2O_3$ (iron(III) oxide) in the course of production of the storage structure; during the operation of the storage cell, the oxidation state of the iron generally changes, and for that reason the storage cell is operated with the compounds FeO (iron(II) oxide) and/or $Fe_3O_4$ (iron(II, III) oxide). The active storage material is especially in the form of a redox pair consisting of iron and iron oxide, the proportion of the respective components being dependent on the charge state of the electrical storage cell.

In another configuration of the invention, the inert material has a particle size distribution with a $d_{90}$ of <10 μm. The term $d_{90}$ is understood to mean that 90% of the particles or grains of the inert material have a particle diameter of less than 10 μm. This $d_{90}$ value is a particle size present in the inert particles prior to production of the storage structure. During operation in the storage cell, the particle size distribution of the storage structure can change because of the described reactivity in the cell.

In a further configuration of the invention, the proportion by volume of the inert material is less than 30%, especially less than 20%, of the volume of the storage structure. A lower proportion by volume of the inert material enables a higher proportion of active storage material. This requires that the inert material, given the relatively low proportion by volume, fulfill its supporting function and spacer function for the grains of the active storage material. Conversely, the active storage material has a proportion of greater than 50%, especially greater than 60%, of the volume of the storage structure.

A further constituent of the invention is a process for producing a storage structure of an electrical metal/air storage cell, comprising the following steps:

First of all, an active storage material is mixed with an inert material. This is used to produce a so-called green body by a ceramic production process. Optionally, the green body can be consolidated in terms of mechanical stability by a thermal treatment, which can also be referred to as sintering process, in which sinter necks having mechanically stabilizing action are formed between the material grains. This green body is inserted into the storage cell. This is followed by operation of the storage cell for at least one charging and discharging operation at a process temperature of more than 500° C., advantageously between 600 and 900° C. It has been found that the desired whisker-like or platelet-like inert particles are formed with the required aspect ratio, especially under operating conditions of the storage cell, when the advantageous material pairs and physical properties described are present.

BRIEF DESCRIPTION OF THE DRAWINGS

Further features of the invention and further advantages are elucidated in detail with reference to the figures which follow. The description of the figures comprises illustrative configurations of the invention which do not constitute a restriction of the scope of protection.

The figures show.

DETAILED DESCRIPTION OF INVENTION

Figure 1:
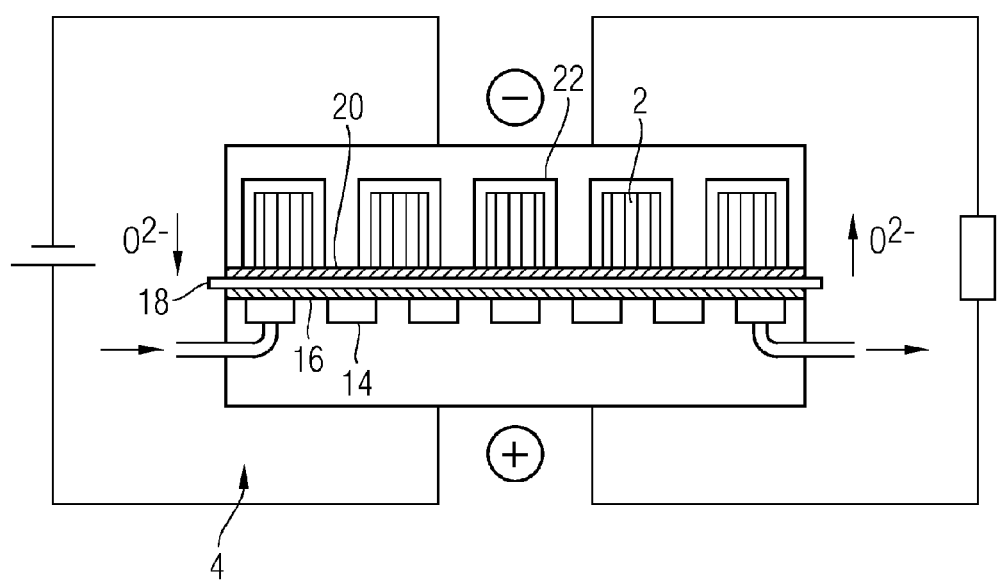
FIG. 1 a schematic view of the way in which an electrical storage cell works.

With reference to FIG. 1, there will first of all be a description, in schematic form, of the way in which a rechargeable oxide battery (ROB) works, to the extent necessary for the present description of the invention. A standard setup of an ROB involves blowing in a process gas, especially air, via a gas supply 14 at a positive electrode, which is also referred to as air electrode 16, with removal of oxygen from the air in the course of discharging (circuit on the right-hand side of the figure). The oxygen passes in the form of oxygen ions $O^{2-}$ through a solid electrolyte 18 that adjoins the positive electrode to a negative electrode 20, which is also referred to as storage electrode. The latter is connected to the porous storage medium via a gaseous redox pair, for example a hydrogen-water vapor mixture.

If an impervious layer of the active storage material were to be present on the negative electrode 20, the storage capacity of the battery would thus rapidly be exhausted.

For this reason, it is appropriate to use a storage structure 2 made from porous material on the negative electrode 20 as energy storage medium, the latter containing a functionally active oxidizable material as an active storage material 6, advantageously in the form of iron and/or iron oxide.

By means of a redox pair which is gaseous in the operating state of the battery, for example $H_2/H_2O$, the oxygen ions transported through the solid-state electrolyte 18, after they have been discharged at the negative electrode in the form of water vapor, are transported through pore channels 10 in the porous storage structure 2 comprising the active storage material 6. According to whether a discharging or charging operation is in progress, the metal or the metal oxide (iron/iron oxide) is being oxidized or reduced and the oxygen required for that purpose is being supplied by the gaseous redox pair $H_2/H_2O$ or is being transported back to the solid-state electrolyte 18 or to the negative electrode 20. This mechanism of oxygen transport via a redox pair is also referred to as the shuttle mechanism.

The advantage of iron as oxidizable material, i.e. as active storage material 6, is that it has about the same open-circuit voltage of about 1 V in its oxidation process as the redox pair $H_2/H_2O$ at a partial pressure ratio of 1; otherwise, an increased resistance arises for oxygen transport as a result of the diffusing components of this redox pair.

The diffusion of the oxygen ions through the solid-state electrolyte 18 requires a high operating temperature of 600 to 900° C. in the ROB described, but this temperature range is also advantageous for the optimal composition of the $H_2/H_2O$ redox pair in equilibrium with the storage material. In this context, it is not just the structure of the electrodes 16 and 20 and of the electrolyte 18 that is subject to a high thermal stress, but also the storage structure 2 comprising the active storage material 6. In the constant cycles of oxidation and reduction, the active storage material has a tendency to sinter and/or to become coarser. Sintering means that the individual grains fuse together to an ever greater extent through diffusion processes, the reactive surface area falls and the continuously open pore structure required for the gas transport disappears. Coarsening means that individual grains grow at the expense of other grains, with a decrease in the numerical density and the reactive surface area of the grains. In the event of a closed pore structure, the $H_2/H_2O$ redox pair can no longer reach the active surface of the active storage material 6, and so the internal resistance of the battery becomes very high even after a partial discharge of the storage means, which prevents further discharge from being technically viable.

One advantage of the ROB is that it can be extended in a virtually unlimited modular manner by virtue of its smallest unit, namely the storage cell. Thus, a small battery for stationary domestic use can be executed, as can an industrial scale system for storage of the energy from a power plant.

Figure 2:
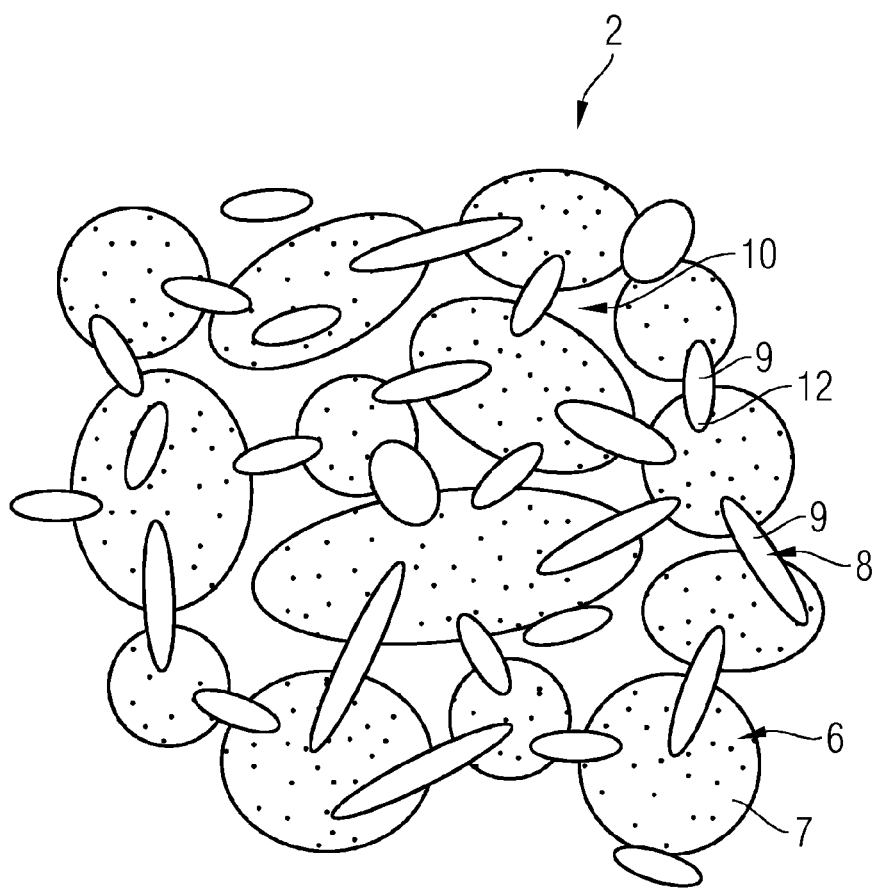
FIG. 2 an enlarged schematic view of the microstructure of the storage structure.

FIG. 2 shows, in enlarged form, a characteristic microstructure of the storage structure. The storage structure 2 especially includes the active storage material 6 having larger grains 7 compared to the particles 9 of the inert material 8. In principle, the active storage material 6 is in any desired grain form; the schematic diagram according to FIG. 2 shows large oval grain cross sections. Pores 10 present between the grains 7 of the active storage material 6 constitute open porosity through which the shuttle gas, especially $H_2/H_2O$, can flow.

The charging and discharging process results in reduction and oxidation of the grains 7 of the active storage material 6, which increases its oxidation state during the oxidation and lowers its oxidation state again in the course of the reduction. This oxidation and reduction process is associated with a constant change in volume of the grains 7 of the active storage material 6. In order that the grains 7 of the active storage material 6 do not sinter or fuse to one another, an inert material 8 in the form of whisker-like particles 9 has been introduced. The particles 9 of the inert material 8 shown in FIG. 2 typically have an aspect ratio of 0.2. They are therefore needle-like grains or particles 9 which are incorporated into the grains 7 of the active storage material 8. The needle-like grains 9 have therefore been stuck into the grains 7 of the active storage material 6, like toothpicks into olives. In this way, the particle 9 of the inert material 8, even after several oxidation and reduction cycles, can space apart the individual grains 7 of the active storage material 6, since there is no spread of the active storage material 6 (iron oxide) over the inert material 8 (zirconia in this example) even after several charging/discharging cycles. Nor is there any chemical reaction between the inert zirconia material and the $H_2/H_2O$ shuttle gas.

It has been found to be appropriate to produce a green body from a mixture of the active storage material ($Fe_2O_3$) and the inert material 8 (zirconia). In the shaping of the storage structure or in the shaping of the green body of the storage structure, it is possible in principle to employ any process customary in ceramic shaping. In this regard, particular mention should be made of uniaxial pressing, isostatic pressing, but also of tape casting or an extrusion process. The mechanical stability of the green body thus produced can in principle also be improved by a sintering operation or a preliminary sintering operation. It has been found to be appropriate to establish the final characteristic microstructure of the storage structure 2 according to FIG. 2 during a test operation of the electrical storage cell 4. In a controlled oxidation or reduction (repeatedly in some cases) of the green body of the storage structure 2 or of the active storage material for the storage structure 2, a desired particle property of the inert material 8 is established, the particles 9 of the inert material 8 being incorporated into the grains 7 of the active storage material 6 and forming the characteristic needle-like shape having the desired aspect ratio of less than 0.7, especially of less than 0.5. The starting particle size of the inert material is advantageously less than 200 nm.

The invention claimed is:

1. A storage structure of an electrical metal/air energy storage cell comprising
   an active storage material and an inert material,
   wherein particles of the inert material comprise a minor diameter of less than 200 nm and an aspect ratio less than 0.7, and
   wherein the particles are incorporated into grains of the active storage material and wherein the particles are effective to support the grains and to space the grains apart from each other, thereby forming pore channels within the active storage material.

2. The storage structure as claimed in claim 1,
   wherein a wetting angle between the active storage material and the inert material is greater than or equal to 90°.

3. The storage structure as claimed in claim 1,
   wherein the active storage material comprises iron and/or iron oxide.

4. The storage structure as claimed in claim 1,
   wherein the inert material is based on zirconia, yttria-stabilized zirconia, calcium oxide, magnesium oxide, alumina, yttria or combinations thereof.

5. The storage structure as claimed in claim 1,
   wherein the proportion by volume of the inert material in the volume of the storage structure is less than 30%.

6. The storage structure as claimed in claim 1,
   wherein the proportion by volume of the active storage material in the volume of the storage structure is greater than 50%.

7. A process for producing a storage structure of an electrical metal/air storage cell, comprising:
   mixing an active storage material with an inert material, wherein particles of the inert material comprise a minor diameter of less than 200 nm and an aspect ratio less than 0.7,
   producing a green body from the mixture,
   introducing the green body into the storage cell,
   operating the storage cell for at least one charging and discharging operation at a process temperature of more than 500° C. after which the particles are incorporated into grains of the active storage material and are effective to support the grains and to space the grains apart from each other, thereby forming pore channels within the active storage material.

8. The storage structure as claimed in claim 1,
   wherein the proportion by volume of the inert material in the volume of the storage structure is less than 20%.

9. The storage structure as claimed in claim 1,
   wherein the proportion by volume of the active storage material in the volume of the storage structure is greater than 60%.

10. A storage structure of an electrical metal/air energy storage cell comprising
    an active storage material and an inert material,
    wherein particles of the inert material are characterized by an aspect ratio from 0.2 to less than 0.7, and
    wherein the particles are incorporated into grains of the active storage material and wherein the particles are effective to support the grains and to space the grains apart from each other, thereby forming pore channels within the active storage material.

* * * * *